Feb. 21, 1967 K. KUPFERBERG ET AL 3,305,763
VOLTAGE/CURRENT REGULATED POWER SUPPLIES
Filed Jan. 29, 1963 6 Sheets-Sheet 1

INVENTORS
KENNETH KUPFERBERG
JAIME ASH
BY Alfred W. Barber
ATTORNEY

Feb. 21, 1967   K. KUPFERBERG ET AL   3,305,763
VOLTAGE/CURRENT REGULATED POWER SUPPLIES
Filed Jan. 29, 1963   6 Sheets-Sheet 2

INVENTORS
KENNETH KUPFERBERG
JAIME ASH
BY Alfred W. Barber
ATTORNEY

INVENTORS
KENNETH KUPFERBERG
JAIME ASH
BY *Alfred W. Barber*
ATTORNEY

INVENTORS
KENNETH KUPFERBERG
JAIME ASH
BY
*Alfred W. Barber*
ATTORNEY

United States Patent Office 3,305,763
Patented Feb. 21, 1967

3,305,763
VOLTAGE/CURRENT REGULATED
POWER SUPPLIES
Kenneth Kupferberg and Jaime Ash, Flushing, N.Y.,
assignors to Forbro Design Corp., New York,
N.Y., a corporation of New York
Filed Jan. 29, 1963, Ser. No. 254,720
7 Claims. (Cl. 323—9)

The present invention concerns rectified alternating current power supplies provided with both voltage and current regulating means and with automatic cross-over provisions from one mode to the other.

A voltage regulated power supply may be defined as a power supply having provisions for maintaining its output voltage constant in the presence of varying operating conditions such as line voltage and/or load impedance changes. A current regulated power supply may be defined as a power supply having provisions for automatically keeping constant its output current in the presence of varying operating conditions such as line voltage and/or load impedance changes. In their simple basic forms these power supplies consist of an input alternating current transformer for changing a given nominal line voltage to a desired alternating current input voltage, a rectifier for rectifying this input voltage, a filter for smoothing the ripple on the rectified voltage, a pair of output terminals to be connected to a load and current or voltage regulating means. The regulating means may utilize silicon controlled rectifiers included in the rectifying means or controlled series pass means between the filter and output terminals or it may utilize both controlled rectifiers and controlled series pass means. Signals to actuate the regulating means are generated by some circuit or device which compares the output voltage or current with a stable reference. One particular circuit for making this comparison and generating a control signal, etc. is set forth in detail in U.S. Patent No. 3,028,538. The bridge control circuit shown in this patent will be utilized in the present invention.

One of the problems which arises in regulated power supplies is that the range of control is limited. For example, if a voltage regulated power supply is over-loaded, the system will attempt to supply constant voltage when the resulting current might over-load the system and cause damage. Similarly if a current regulated power supply is connected to a load demanding too much voltage in order to pass the current required, it too may be over loaded and suffer damage. One way in which these over-load situations can be prevented is to provide current limiting in a voltage regulated power supply and voltage limiting in a current regulated supply.

According to the present invention both voltage and current limiting are provided in the same power supply so that the power supply will always operate in either the constant voltage or the constant current mode. In addition a power supply in accordance with the present invention automatically changes from one mode to the other. In the preferred embodiment of the present invention two bridge control circuits are utilized, one for voltage regulation and the other for current regulation. The two signals from the two bridge circuits are combined in an analog OR gate so that one or the other is controlling at all times. Both voltage and current may be controlled and an automatic cross-over from one mode to the other takes place at a point depending on the relative voltage and current settings and the resistance of the load.

One particular advantage gained in the system of the present invention is that the cross-over point can be accurately set. It is often desirable to operate a voltage regulated power supply at a predetermined voltage and current and to limit the current very close to the normal operating point. This capability is herein provided. Conversely it is possible with this invention to set very closely the limiting voltage to the actual operating voltage, when working in the current mode.

Accordingly the principal object of the present invention is to provide a method of and means for regulating voltage and current in a power supply and to provide automatic and settable cross-over from one mode to the other.

Another object is to provide simple and accurate control for both voltage and current.

Still another object is to utilized an effective bridge circuit for the voltage control and a second and similar bridge circuit for the current control.

A further object is to utilize the two bridge circuits one for voltage control and the other for current control to control silicon controlled rectifiers or series pass transistors, or both.

These and other objects of the present invention will be apparent from the detailed description of the invention given in connection with the various figures of the drawing.

Figure 1:
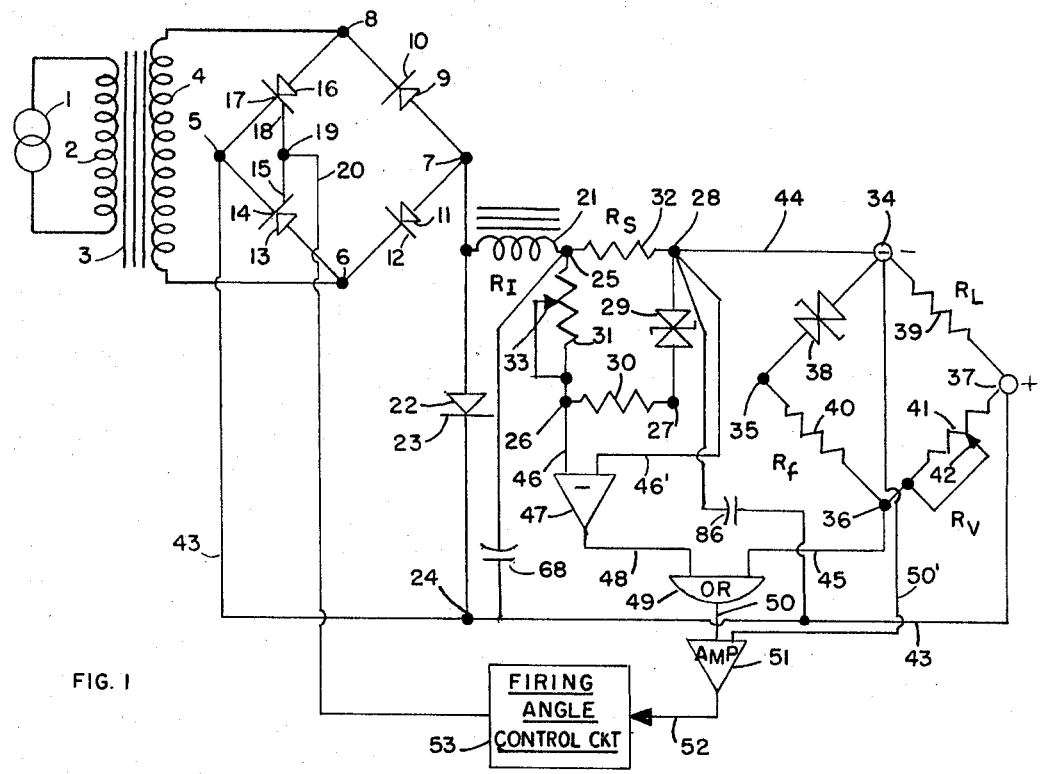
FIGURE 1 is a schematic circuit diagram, partly in block form, of one form of the present invention for controlling silicon controlled rectifiers as crossover regulators.

FIG. 1 shows a silicon controlled rectifier type of regulator with two control bridge circuits, one for voltage control and the other for current. A source of suitable alternating current such as power line is represented by source 1 connected to the primary 2 of a suitable line coupling transformer 2–3–4. Secondary 4 of suitable voltage for the intended use feeds a rectifier bridge connected across terminals 5–6–7–8 and including the rectifiers 9–10, 11–12 and silicon controlled rectifiers 13–14 and 16–17. The alternating current input from secondary 4 is connected to diagonal terminals 6 and 8 while the rectified direct current output is taken from the other diagonal terminals 5 and 7. Output terminal 7 is negative and is connected to filtering means comprising choke 21 and capacitor 68 while the positive terminal 5 is connected through line 43 to the positive load terminal 37. The negative line from choke 21 continues from terminal 25 through current sensing resistor 32 to terminal 28 and over line 44 to the negative load terminal 34. The load 39 is connected between terminals 34 and 37. Further filtering is afforded by the RC filter network comprised by sensing resistor 32 and capacitor 86.

This circuit utilizes two bridge circuits, one including the current sensing resistor 32 for current regulation and control and the other including the load resistor 39 for voltage regulation and control. The current control bridge includes the four terminals 21–28–27 and 26 and the four arms interconnecting these terminals, current sensing resistor 32, reference voltage Zener diode 29, resistor 30 and variable current control resistor 31 which is varied by adjustment arm 33. Zener diode 29 is supplied with current from a suitable source, not shown, in order to establish a reference voltage between terminals 27 and 28. The current error signal is taken off across terminals 26 and 28 over leads 46 and 46'. The error signal is inverted in phase reversing amplifier 47 and the output is applied to analog OR gate 49 over lead 48. The voltage control bridge includes the four terminals 34–37–36 and 35 and the four arms interconnecting these terminals, load resistor 39, variable voltage control resistor 41 varied by variable contact 42, resistor 40, and the reference voltage across Zener diode 38. Zener diode 38 is supplied with current from a suitable source, not shown, in order to establish a reference voltage between terminals 34 and 35. The error voltage is taken off between terminals 34 and 36 and taking negative lead 44 as a reference, the error voltage from terminal 36 is applied over lead 45 to analog OR gate 49. The predominant of the two error voltages from analog OR gate 49 is applied over lead 50 to error amplifier 51 and the amplified error signals are applied to the firing angle control circuit 53 over lead 52. The resulting firing angle control voltage from 53 is applied over lead 20 to the silicon controlled rectifier control electrodes 15 and 18. While detailed circuits are shown below for the inverter 47, the analog OR gate 49, the error amplifier 51 and the firing angle control circuit 53, it is not intended to limit the regulator to any specific circuits since these circuits are generally well known in the art and many conventional circuits may be used for these functions. On the other hand, the detailed circuits shown and described below contain novel features.

The voltage control bridge as described above and in the referenced patent is balanced when:

Reference voltage 38/resistance 40
=load voltage/resistance 41

When the above condition is not met, an output signal from terminal 36 is applied through analog OR gate 49 to amplifier 51 and firing angle control circuit 53 which in turn controls rectifiers 16–17 and 13–14 to restore the voltage to its balance value, provided that the the voltage error predominates over the current error. The current control is similar in that the current bridge is balanced when:

Reference voltage 29/resistance 30
=voltage drop in resistor 32/resistance 31

Since the voltage drop in resistance 32 is equal to the current in lead 44 multiplied by the resistance of resistor 32, this drop is proportional to the load current. As in the case of the voltage bridge, when the current control bridge is out of balance as expressed by the last equation, an error voltage is developed from terminal 26 to reference line 44, and is reversed in polarity by inverter 47, it is then applied to analog OR gate 49, and in turn to amplifier 51, firing angle control circuit 53 and rectifiers 16–17 and 13–14. The control thus provided returns the current bridge to balance by adjusting the current to its predetermined value, provided that the current error predominates over the voltage error. Thus it can be seen that considering the voltage and current bridge control circuits independently the output voltage or the output current may be regulated. Control 41–42 will set the voltage to be regulated and control 31–33 will set the current to be regulated. However, since the error voltages from the two bridges are applied to analog OR gate 49, the algebraically larger one of these voltages will take over and become the controlling voltage, biasing off the other section of the gate. In other words, the system will operate as a voltage regulated power supply for all currents which are less than the current called for by the current control bridge, at which point the system automatically crosses over to a current regulated power supply and then it operates as a current regulated power supply for all higher currents. Conversely, the system operates in the current mode for any load requiring a compliance voltage less than the setting of the voltage control. When the load compliance voltage exceeds that setting, the system automatically switches over to a voltage regulator.

The cross over point is determined by both the setting of the voltage control, and the setting of the current control, as follows:

$$R_{cr} = \text{Crossover load resistance} = \frac{\text{Voltage control setting}}{\text{Current control setting}}$$

For any load resistance larger than $R_{cr}$, the system operates as a voltage regulator. Below $R_{cr}$, the system is a current regulator.

Figure 2:
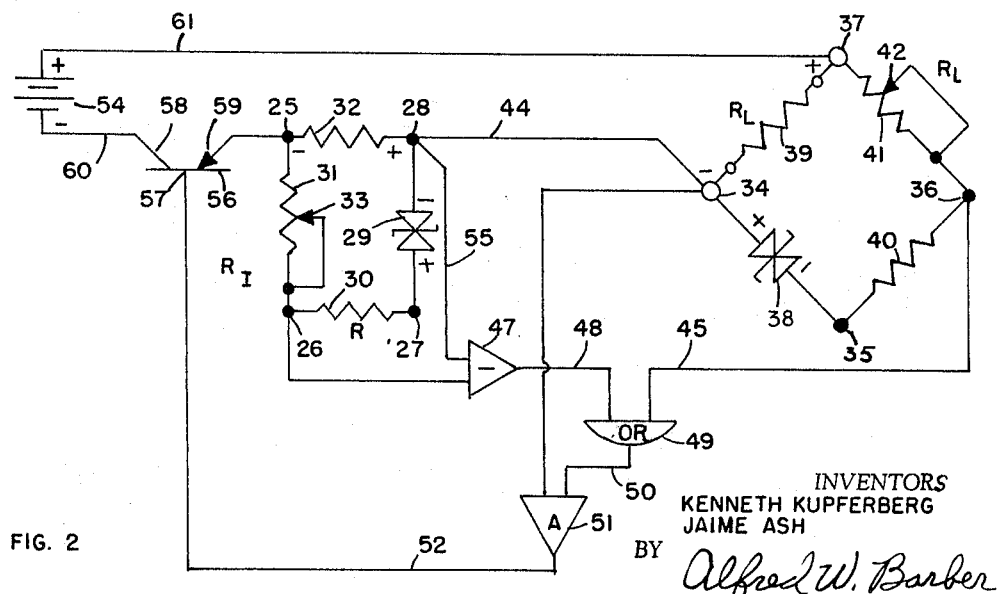
FIGURE 2 is a schematic circuit diagram, partly in block form, of another form of the present invention for controlling a series pass transistor as the crossover regulator.

FIG. 2 shows how the two bridge circuits are used with a series pass transistor to control output voltage and current from a regulated power supply. The voltage control bridge having terminals 34, 35, 36 and 37 together with the current control bridge having terminals 25, 26, 27 and 28 are similar to the similarly numbered bridges shown and described in connection with FIG. 1 above and function in a similar manner except in the manner in which the output of amplifier 51 is utilized to control the output voltage and current. The output of amplifier 51 which consists of the amplified over riding control voltage from the two bridges, i.e. which ever one dominates is applied over lead 52 to the control base 57 of series pass transistor 56. In this figure the source of unregulated voltage is not shown in detail but is represented merely by the battery 54. This unregulated voltage is applied over lead 61 to load terminal 37 and over lead 60 to collector 58 of series pass transistor 56. The controlled current and voltage from emitter 59 of pass transistor 56 is applied to terminal 25 of the current bridge. This circuit functions as does the circuit of FIG. 1 to control the output voltage and current except the control is exercised through pass transistor 56 rather than through the medium of firing angle control and silicon controlled rectifiers as shown in FIG. 1. Since the two circuits are analogous except for the control medium used, the operation of the circuit of FIG. 2 will be clear from the more detailed description given above in connection with FIG. 1.

Figure 3:
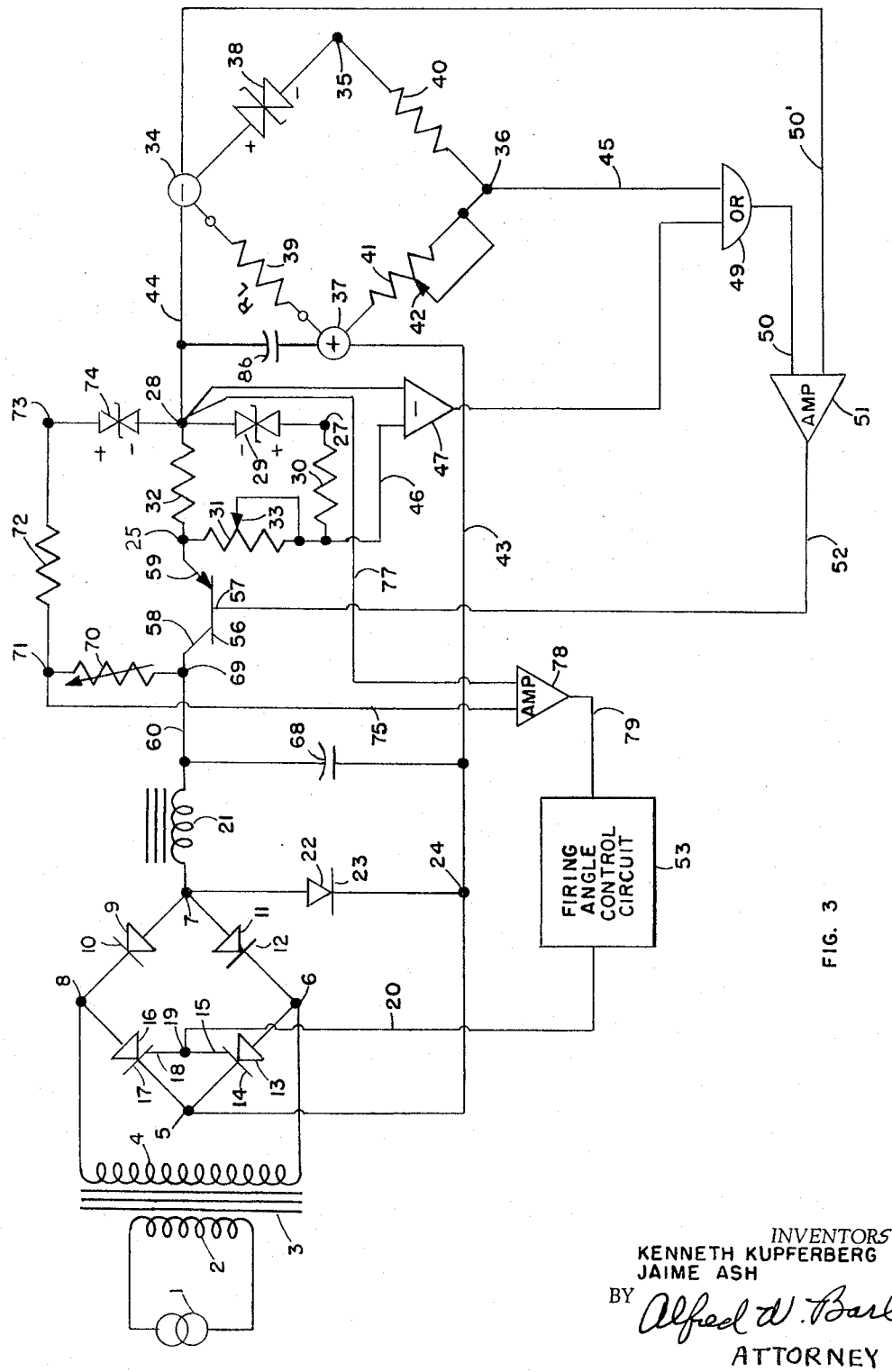
FIGURE 3 is a schematic circuit diagram, partly in block form of a modification of the present invention representing a combination of FIGURES 1 and 2, where the SCR's are used as pre-regulators, and the series pass transistors are used as the main crossover regulator.

Since the particular methods of control or regulation shown in FIGS. 1 and 2 have their own advantages, it has been found advantageous to combine the two as shown in FIG. 3 wherein a third bridge control is utilized to regulate the voltage across the series pass transistor so as to minimize its dissipation. The circuit of FIG. 3 utilizes the voltage control bridge having terminals 34, 35, 36 and 37 and the current control bridge having terminals 25, 26, 27 and 28 similar in construction and function to similarly numbered bridges and components of FIGS. 1 and 2. The similarity continues to include inverter 47, analog OR circuit 49 and amplifier 51. This circuit (FIG. 3) utilizes both the silicon controlled rectifiers 16–17–18, 13–14–15 and the firing angle control circuit 53 together with pass transistor 56. However, the pass transistor 56 is controlled from the voltage and current bridge signals while the firing angle control 53 and its connected silicon control rectifiers are controlled from a third bridge circuit connected across the pass transistor 56 for the purpose of controlling and regulating the drop across this transistor.

When the pass transistor 56 is used alone to control and regulate the output, operating conditions may be encountered calling for large power dissipation in this pass transistor. In order to limit the dissipation in the pass transistor and thereby to make it more reliable and less expensive to provide, the voltage across the pass transistor is regulated. This is done by means of the third bridge having terminals 69, 71, 73 and 28. In this bridge circuit the reference voltage is established across Zener diode 74, connected between terminals 28 and 73; the fixed reference resistor is 72 connected between terminals 71 and 73; the adjustable pass element voltage control resistor 70 is connected between terminals 69 and 71; while the voltage to be controlled is the drop from collector 58 to emitter 59 in series with the small drop in current sensing resistor 32 appearing across terminals 28 and 69. The error voltage appearing between terminals 28 and 71 is applied to error amplifier 78 over leads 77 and 75 respectively, and after amplification is applied over output lead 79 to the firing angle control circuit 53, the output of which is applied over lead 20 to control gates 15 and 18 of the silicon controlled rectifiers. This bridge operates in the manner set forth above to control and regulate the voltage across pass transistor 56 in accordance with the setting of control resistor 70. Capacitor 68 connected between lines 60 and 43, together with choke 21, provides filtering of the preregulator output D.C., and helps to stabilize the system.

Figure 4:
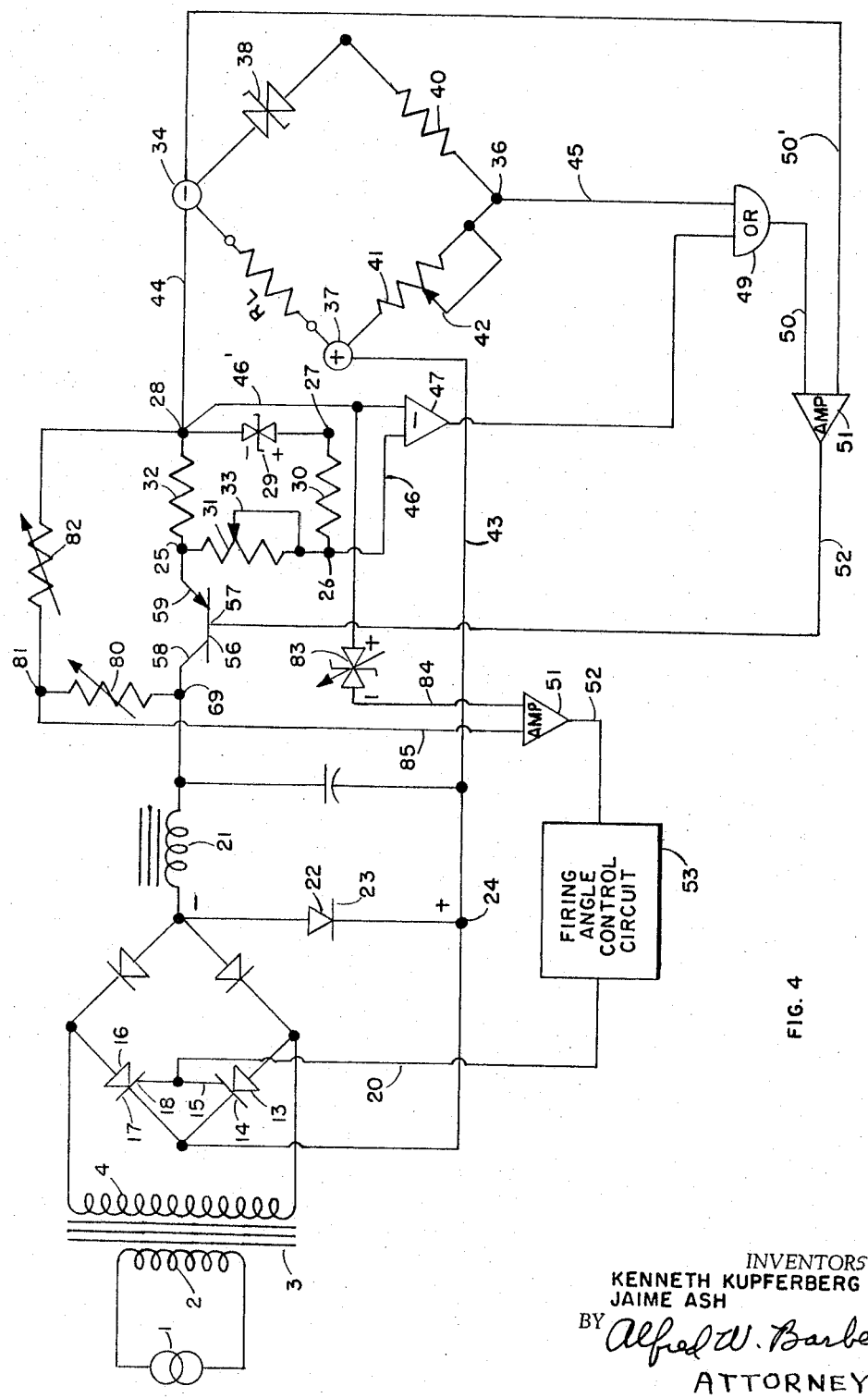
FIGURE 4 is a schematic circuit diagram of an alternate and preferred form of the combined dual regulator of FIGURE 3.

FIG. 4 shows a circuit having similar functions and components as the circuit shown in FIG. 3 above except that the third control circuit for controlling and regulating the voltage across the pass transistor 56 is somewhat modified. In place of the third bridge circuit used to regulate the drop across pass transistor 56 is a circuit which may be generally satisfactory since it is only required to regulate the pass element voltage to a fixed value. A portion of the drop across the pass transistor 56 taken at terminal 81 between resistors 80 and 82 bridged from collector 58 to terminal 28 is compared to a reference voltage established across Zener diode 83 in a differential amplifier 51 and the amplified error signal effects the control function described above in connection with FIG. 3. While resistors 80 and 82 are shown as variable, only one of them needs to be adjustable. This circuit will provide a predetermined controlled voltage drop across pass transistor 56 which is equal to the Zener voltage drop multiplied by the ratio of the resistances of resistors 82 plus 80 to the resistance of resistor 82. This obviously must always be greater than the voltage drop across reference Zener 83 so that this circuit is useful if it is not required that the pass transistor drop be less than the Zener reference voltage. The bridge circuit used in FIG. 3, on the other hand, permits controlling the pass transistor drop to zero as is characteristic of the control function provided by the bridge circuit.

Figure 5:
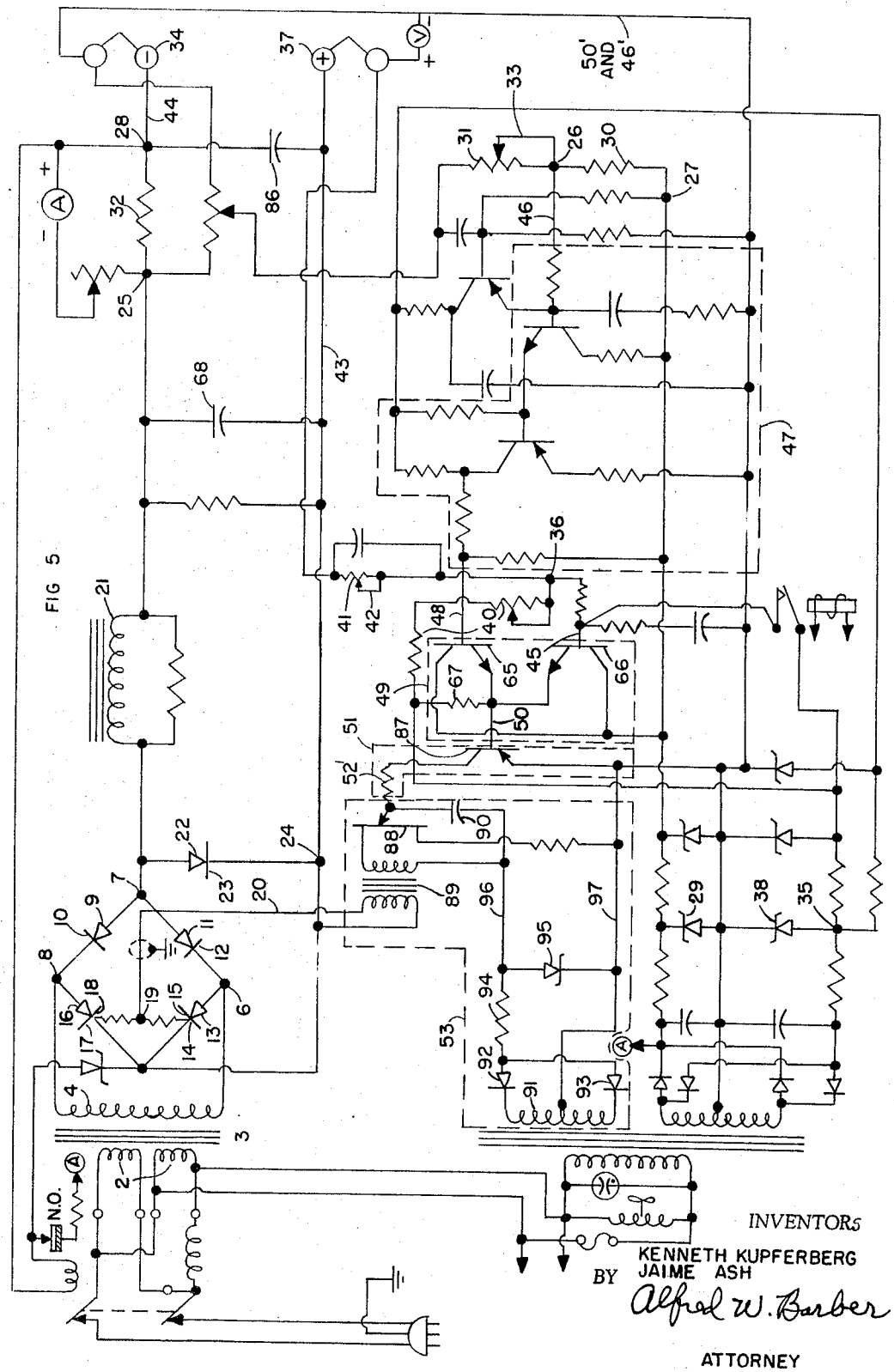
FIGURE 5 is a complete schematic circuit diagram of the form of the invention shown in FIGURE 1.

FIG. 5 is a complete schematic circuit diagram of a regulated power supply in accordance with the form shown in FIG. 1. Corresponding circuit elements of the two drawings are designated by the same numbers. Since the operation of the circuit of FIG. 5 will thus be clear from the above description of FIG. 1 only the OR circuit 49, the amplifier 51 and the firing angle control circuit 53 here shown in complete form will be described in detail. The components shown in FIG. 5 making up these parts are indicated inside the dash line boxes labeled 49, 51 and 53. The OR circuit 49 includes the two transistors 65 and 66 connected to the common emitter resistor 67. This is an emitter follower circuit and the voltage at the emitters will be essentially equal to the voltage of one of the bases of the two transistors and this will be the base with the greater positive voltage applied to it. The bases receive voltages from the two control bridges over leads 45 and 48 so which ever control bridge supplies the higher positive output voltage over these leads will be in control and the control voltage thus appearing across resistor 67 is applied to amplifier 51 over lead 50. Amplifier 51 consists in transistor 87 acting as a direct current amplifier and feeding output current through resistor 52' to charge capacitor 90 in the firing angle control circuit 53. This firing angle control circuit 53 includes a voltage regulated source of voltage across Zener diode 95 provided from power transformer secondary 91 through rectifiers 92 and 93 and resistor 94. The regulated voltage across Zener diode 95 appears across leads 96 and 97 and is used to charge capacitor 90 at a rate controlled by amplifier 87 connected through resistor 52'. The balance of the firing angle control circuit consists in a suitable coupling to the controlled rectifier such as pulse transformer 89 connected between the silicon controlled rectifier control electrodes 15 and 18 over lead 20 and unijunction transistor 88. When the critical control voltage on the unijunction transistor input electrode connected to capacitor 90 is reached this transistor fires generating a pulse in transformer 89 and firing the controlled rectifiers 13 and 16.

Figure 6:
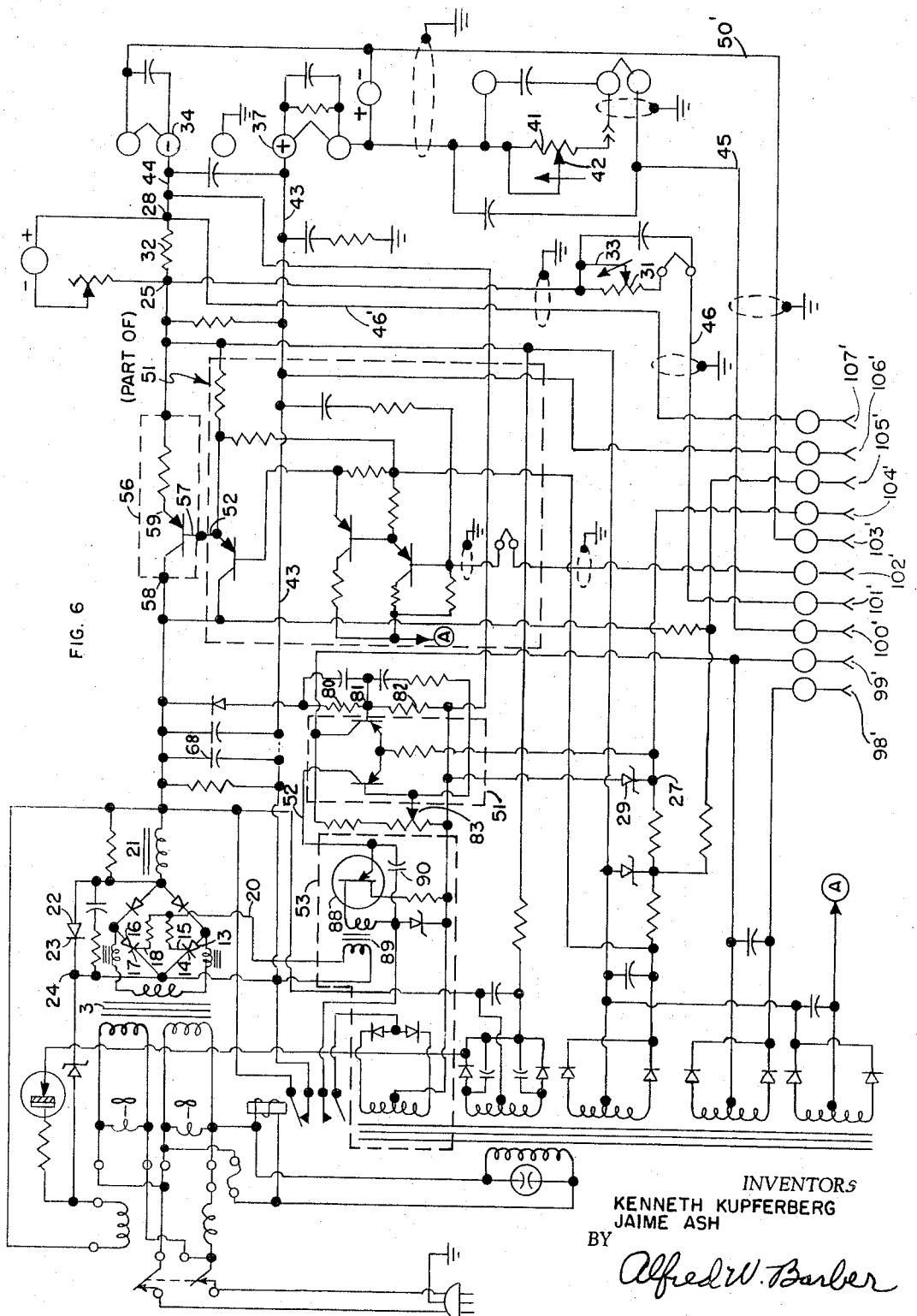
FIGURE 6 is a schematic circuit diagram which when combined with the reference voltage source and amplifier circuits of FIGURE 7 constitutes a complete circuit of the form of the invention shown in FIGURE 4.
Figure 7:
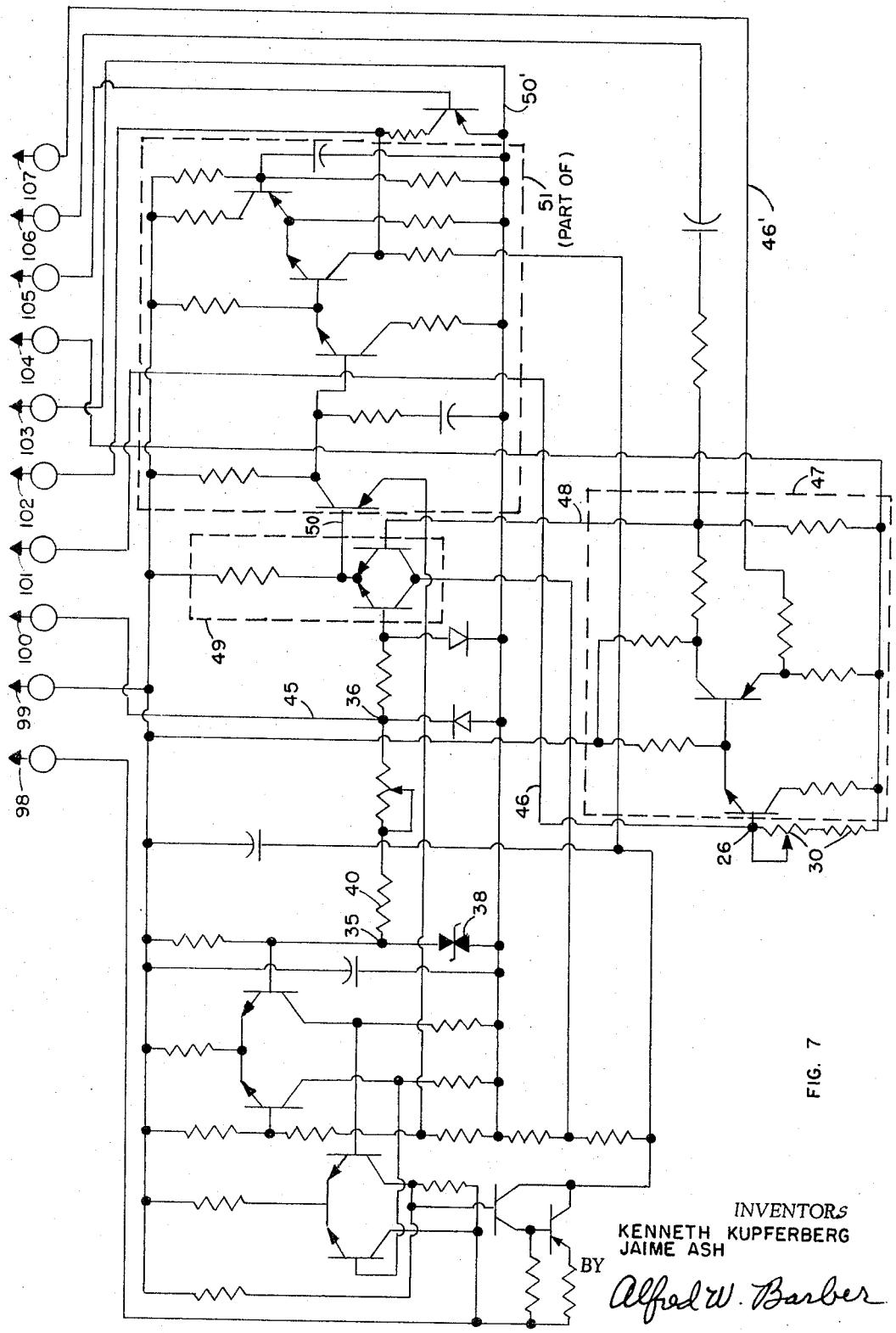
FIGURE 7 is a schematic circuit of voltage reference and amplifier circuits suitable for use with FIG. 6

FIGS. 6 and 7 taken together make up a complete detailed schematic circuit in accordance with the form of the invention shown in FIG. 4. Corresponding parts in FIGS. 4, 6 and 7 bear the same numbers. The firing angle control circuit 53 is similar and has been described in detail in connection with FIG. 5 above. FIGS. 6 and 7 are part of the same device, however, the amplifiers and reference voltage devices of FIG. 7 may be mounted as a plug-in unit with pins 98 through 107 mating corresponding sockets 98' through 107' of the main unit shown in FIG. 7. Thus, when the plug-in circuit of FIG. 6 is connected to the main unit shown in FIG. 7, a complete regulated power supply with current/voltage cross-over is formed in accordance with FIG. 4. Since all basic functions of the circuit have been described in connection with other figures in the case, the details of the circuit as provided by unnumbered incidental parts seems unnecessary and may only serve to confuse. The operation of the circuit can be followed from the detailed description of the prior figures.

While only a few forms of the present invention have been shown and described many modifictions will be apparent to those skilled in the art and within the spirit and scope of the invention as set forth in particular in the appended claims.

What is claimed is:

1. In a regulated power supply, the combination of, a source of voltage to be regulated, means for regulating the voltage of said source and responsive to a control signal, connected to said source, a voltage control bridge circuit including first, second, third and fourth terminals, reference voltage means connected between said first and fourth terminals, reference resistance means connected between said third and fourth terminals, adjustable resistance means connected between said second and third terminals, output voltage terminals connected to said first and second terminals, a current control bridge circuit including first, second, third and fourth terminals, a current sensing resistor connected between said first and fourth terminals of said current control bridge, a connection between said fourth terminal of said current control bridge and said regulating means, reference voltage means connected between said first and second terminals of said current control bridge, reference resistance means connected between said second and third terminals of said current control bridge, adjustable resistance means connected between said third and fourth terminals of said current control bridge, a common connection between said first terminal of said voltage control bridge and said first terminal of said current control bridge, an OR gate including two input means and one output means, an amplifier connected to amplify current bridge unbalance voltages connected between said first and third terminals of said current control bridge and one input means of said OR gate, a connection between said third terminal of said voltage control bridge and the other input means of said OR gate whereby the OR gate provides an output depending on the relative unbalance voltages of said third terminals of said bridges, and amplifying means connected between said output of said OR gate and said regulating means for controlling the output across said output terminals as a function of the unbalance voltages of said third terminals of said bridges whereby the output across said output terminals is alternatively under the control of one of said bridges.

2. A regulated power supply as set forth in claim 1 wherein said regulating means includes at least one silicon controlled rectifier.

3. A regulated power supply as set forth in claim 1 wherein said regulating means includes at least one transistor.

4. A regulated power supply as set forth in claim 1 wherein said regulating means includes at least one silicon controlled rectifier and at least one transistor.

5. A regulated power supply as set forth in claim 1 wherein said control signal responsive means includes an OR circuit adapted to control said regulating means in accordance with the predominating signal from said bridges.

6. A regulated power supply as set forth in claim 1 and including additional regulating means, and control means coupled between said first regulating means and said additional regulating means for maintaining predetermined operating conditions in said first regulating means.

7. A regulated power supply as set forth in claim 1 wherein said control signal responsive means includes a polarity reversing means coupled to one of said third terminals and an OR circuit coupled to the other of said third terminals and said polarity reversing means.

References Cited by the Examiner
UNITED STATES PATENTS

| | | | |
|---|---|---|---|
| 2,979,653 | 4/1961 | Wilcox | 323—22 |
| 3,028,538 | 4/1962 | Rosenfeld | 323—22 |
| 3,096,475 | 7/1963 | Brooks | 323—22 |
| 3,218,540 | 11/1965 | Jackson | 321—18 |

OTHER REFERENCES

Riordon: "Power Supply Uses Switching Preregulation," Electronics, March 19, 1962 (pages 62–64).

Wilson: "Designing Transistorized Voltage Regulators," Electronics, September 23, 1960 (pages 62–65).

JOHN F. COUCH, *Primary Examiner.*

K. D. MOORE, *Assistant Examiner.*